Inventor:
Harvey F. Phipard, Jr.
by Abbott Spear
Attorney

Inventor:
Harvey F. Phipard, Jr.
by Abbott Spear,
Attorney

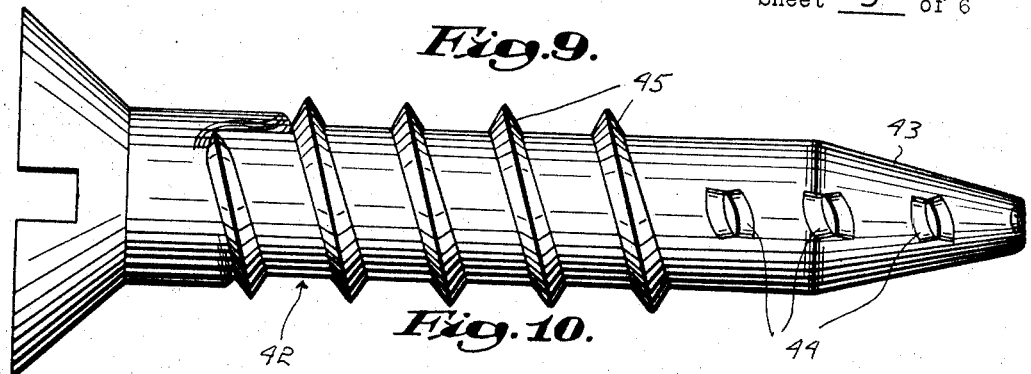
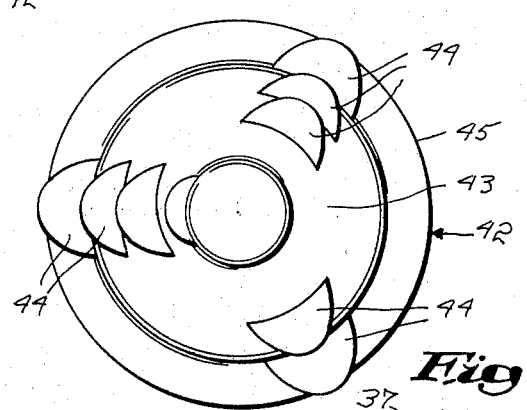
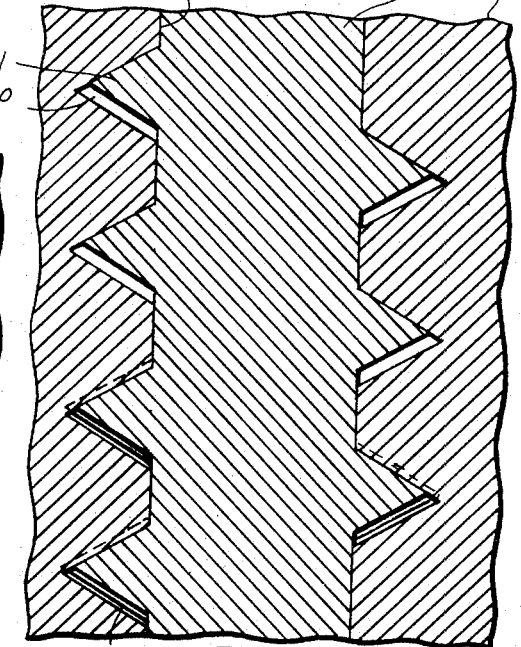
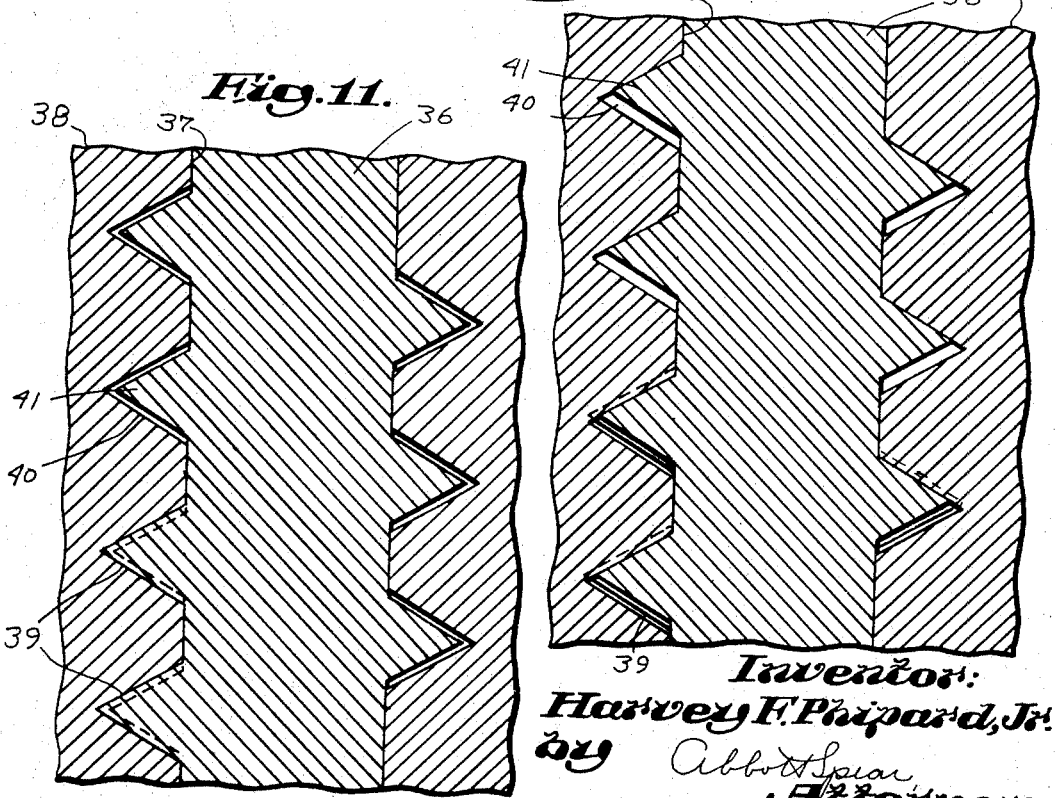

INVENTOR.

HARVEY F. PHIPARD, JR.

BY
BUCKHORN, CHEATHAM & BLORE
ATTORNEYS

Feb. 11, 1969  H. F. PHIPARD, JR  3,426,642
SELF-TAPPING SCREWS WITH THREAD-FORMING PROJECTIONS
Filed Feb. 5, 1962

INVENTOR.
HARVEY F. PHIPARD, JR.

BY
BUCKHORN, CHEATHAM & BLORE
ATTORNEYS 3,426,642
SELF-TAPPING SCREWS WITH THREAD-FORMING PROJECTIONS
Harvey F. Phipard, Jr., South Dartmouth, Mass., assignor to Research Engineering and Manufacturing, Inc., New Bedford, Mass., a corporation of Massachusetts
Continuation-in-part of application Ser. No. 6,322, Feb. 2, 1960. This application Feb. 5, 1962, Ser. No. 172,057
U.S. Cl. 85—46                                    8 Claims
Int. Cl. F16b *33/02, 33/06, 39/28*

The present invention relates to self-tapping screws and to other thread-forming devices having thread-forming projections or protuberances in the work-entering portions thereof, and a method for making the same.

This is a continuation-in-part of application Ser. No. 6,322, filed Feb. 2, 1960 and now abandoned.

The present invention is concerned with thread-forming devices such as self-tapping screws, thread-forming taps, and like devices which form internal threads by a swaging action. The principal advantage of such screws, for example, is that they produce no chips during thread formation. However, conventional screws of the swaging type require a high driving torque, which is especially troublesome when such screws are driven with clutch-controlled power drivers in which the clutch must be set so that every screw is fully seated before disengagement. The trouble results from the fact that if the driver is set to deliver enough torque to drive all screws as tightly as needed, some of the screws may strip or ream themselves out of the hole into which they are being driven.

There are several reasons for this objectionable result. One such reason is that the difference between the driving torque and the stripping strength of the screws is frequently less than the inherent variation of the torque release values of the clutches of power drivers. Thus, screw failure may occur when the clutch does not release before the stripping or failing strength of the screw is exceeded, resulting in costly production delays.

It will be appreciated that objectionable stripping can be minimized by increasing the difference between stripping torque and the driving torque. By reducing the driving torque of a self-tapping screw substantially while maintaining its stripping torque or strength, at a maximum value, the differential between the two can be increased appreciably. Then, by setting clutches of power drivers at lower torque release values to correspond with the lower driving torque, the greater differential will encompass the large variations in actual release valves which can be expected for a given clutch setting. In addition the screw will naturally be easier to drive.

Driving torque is largely a result of the friction caused by the intimate contact of the surfaces of the screw thread with the side walls of the pilot hole in the parent material being threaded and of the resistance of the parent material to thread-forming. Most of the work of thread-forming is performed by the tapered work-entering portion of the screw. It is not desirable to attempt the use of lubricants for reduction of driving friction since clean, dry screws are preferred. The present invention does effect a substantial reduction in the driving torque by a modification in the design of the screw itself, and does not rely upon any lubricant, plating or any other surface finish.

It is therefore a principal object of the present invention to provide new and improved thread-forming devices, such as self-tapping screws, thread-forming taps and the like, which are characterized by a plurality of annularly spaced apart thread-forming projections or protuberances arranged in the helical path of the thread over at least the work-entering end portion and which are so constructed as to effect a substantial reduction in driving torque as compared with that of a conventional swaging type thread-forming device.

More specifically, in accordance with the present invention contact friction is reduced to a minimum, at least in the work-entering portion, by providing thread clearance in such portion except at a minimum number of points where projections are provided which actually swage the internal threads in the pilot hole being threaded. The projections or protuberances are so spaced and arranged that they support the screw with the flank or flanks of the thread of the screw out of any substantial frictional contact with the thread being formed in the work and thus friction is reduced to a fraction of its usual value and, accordingly, the driving torque is reduced to a corresponding extent.

It is a further object of this invention to accomplish an increase in differential between driving and stripping torque of thread-forming devices by reducing the driving torque as indicated above while holding the stripping torque substantially unchanged. In order to maintain high stripping torque, thread clearance between the screw shank and the work piece must be kept to a minimum. In the present invention the retention of the stripping torque, that is, the holding power of the screw, may be accomplished by making the difference in cross-sectional dimensions between the projections and the thread of the screw on the work entering and just enough to prevent contact between the thread flanks of this portion of the screw and the thread being formed. This difference may be so small that full thread flank contact is effected by requiring a slight brinelling of the projections into the mating hole thread when the screw head is so seated as to draw the assembly together.

Another object of the present invention is to provide new and improved self-tapping screws which will form internal threads without producing chips and which will have a substantially lower driving torque than previously available self-tapping screws of the swaging type, by providing a plurality of thread-forming projections or protuberances in a helical path along the tapered work-entering portion of a thread-forming screw having a generally cylindrical main shank portion provided with a helical thread of high torque strength.

More specifically, it is an object of the present invention to provide a new and improved self-tapping screw having a minimum driving torque and maximum stripping strength by providing a threaded main shank of circular cross section and a plurality of projections or protuberances on the tapered work-entering end of the screw that are arranged and disposed to define a thread-forming spiral. These projections or protuberances are either formed as part of a thread commencing at the work-entering end of the screw, or as separate spaced apart elements arranged along the helical path extended of the thread on the main shank portion, there being no thread as such between the projections.

A further object of the present invention is to provide a new and improved method for making a threaded fastener having the above-described characteristics. Briefly, the method includes rolling threads on the shank and work-entering portions of a blank and simultaneously expressing thread forming protuberances from the flanks of the thread at least along the work-entering, tapered end portion, and spaced apart in the helical direction along such thread.

More specifically, the method includes rolling a blank of circular cross section between a pair of thread-rolling dies. The dies are so designed that during the rolling operation, the flow of metal defining the thread of the work entering end portion is so controlled as to cause metal to be expressed from the flanks of the thread being formed thereby simultaneously to form circumferentially spaced apart protuberant portions adapted for swaging threads in a pilot hole complementary to the threads on the shank portion of the fastener.

And a still further object of the invention is to provide a new and improved self-tapping device, and method for making the same, having thread-forming projections in the work-entering portion thereof, and in addition, at least one associated depression in the surface of the device adjacent each such projection from which a substantial portion of the material is displaced during the rolling operation to facilitate the formation of such adjacent projection.

In the accompanying drawings, there are shown illustrative embodiments of the invention from which these and other of the objectives, novel features, and advantages will be readily apparent. In the drawings:

FIG. 9 is a side elevation of another embodiment of a self-tapping screw in accordance with the invention;

FIG. 10 is an end view of the screw shown in FIG. 9;

FIG. 11 is a fragmentary and somewhat schematic section illustrating thread-forming with a self-tapping screw in accordance with the invention; and FIG. 12 is a similar view illustrating the brinelling of the projections when the screw is fully seated;

Figure 2:
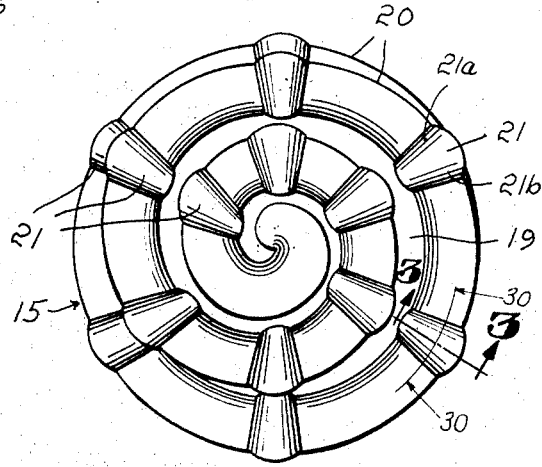
FIG. 2 is a view of the work-entering end thereof.
Figure 3:
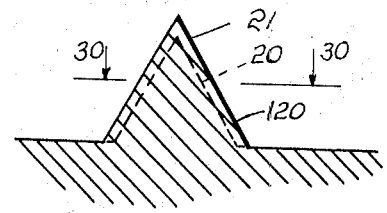
FIG. 3 is a section taken approximately along the indicated lines 3—3 of FIG. 2.
Figure 24:
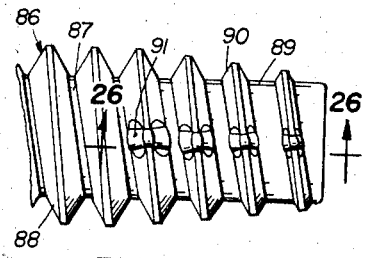
Figure 25:
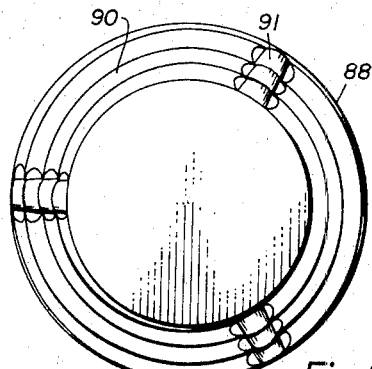
Figure 26:
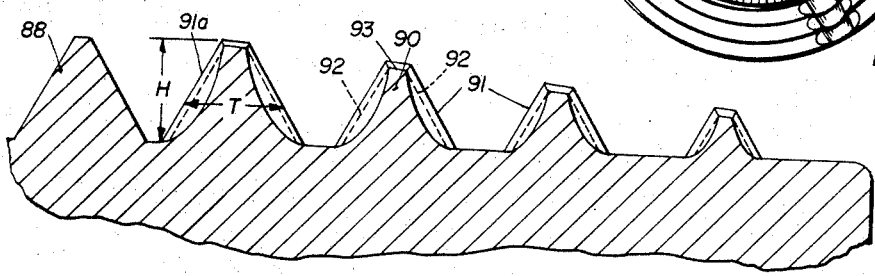
Figure 27:
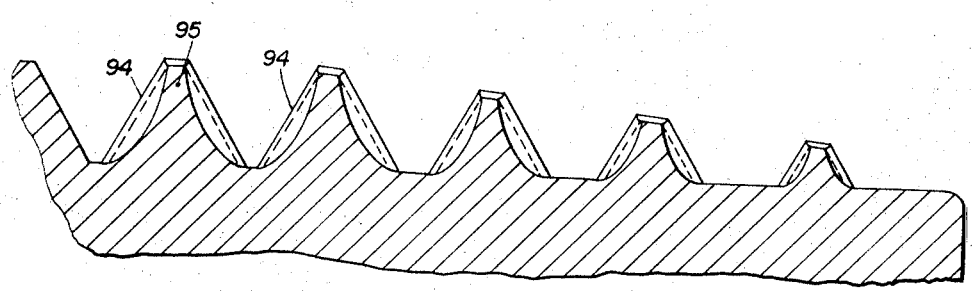
Figure 28:
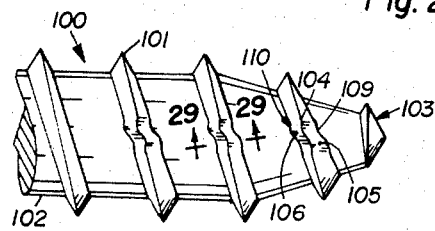
Figure 29:
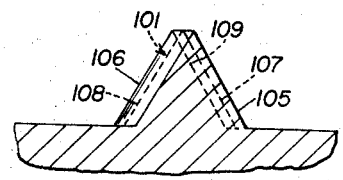
Figure 30:
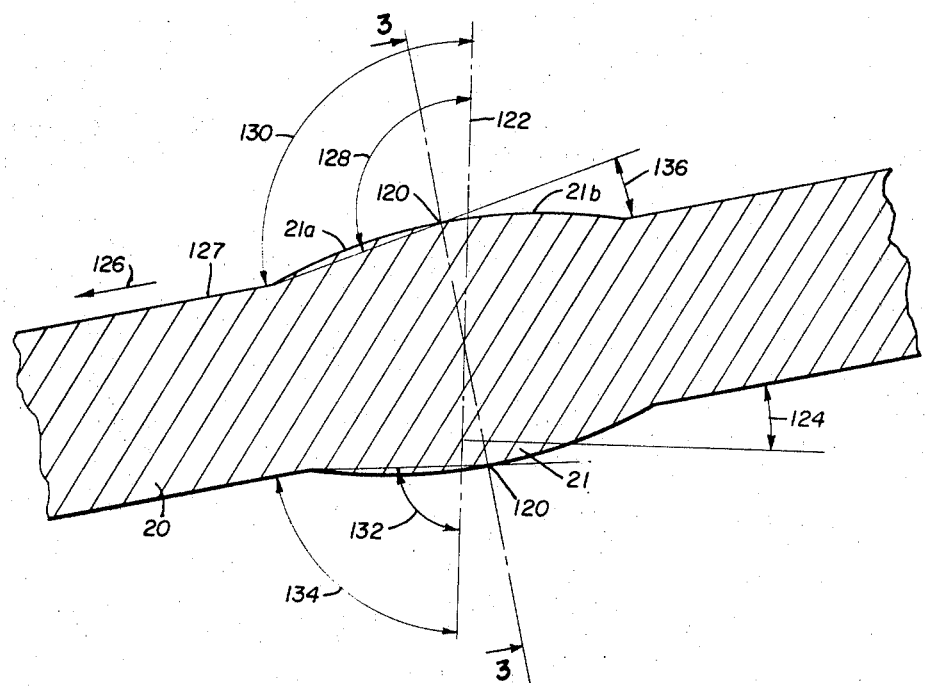

FIGS. 15 to 23, inclusive, are side and sectional views of portions of screws illustrating still further modifications of the present invention;

FIG. 24 is a side elevational view of a portion of a screw in accordance with another modification of the present invention;

FIG. 25 is an enlarged end view of the screw of FIG. 24;

FIG. 26 is an enlarged cross section of the threads in the work-entering end of the screw of FIG. 24, taken in an axial plane along the line 26—26 of FIG. 24;

FIG. 27 is a view similar to FIG. 26 but illustrating a still further modification;

FIGS. 28 and 29 illustrate another modification of the present invention;

FIG. 30 is an enlarged fragmentary cross-sectional view taken along the pitch line of the thread through one of the projections or protuberances such as along the line 30—30 of FIGS. 2 and 3.

In this application the following definitions shall apply:

"Thickness" of a thread or of a projection is the distance between the flanks of the thread or projection measured at a specified distance from and parallel to the fastener axis;

"Thread form" or "projection form" is the profile of the thread or projection in cross section for a length of one pitch in an axial plane; and "Clearance" in a thread assembly is the distance between a thread surface and the opposing surface of a mating thread, measured perpendicular to the thread axis at the crest and parallel to the axis along the flanks.

Figure 1:
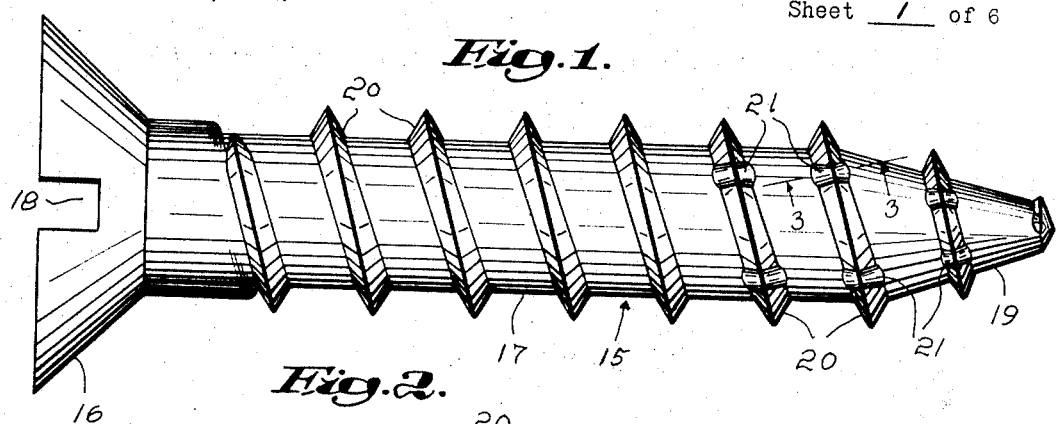
FIG. 1 is a side elevation of a self-tapping screw in accordance with the invention.

In the embodiment of the invention shown in FIGS. 1–3, a self-tapping screw 15 of the gimlet point type is shown having an enlarged upset head 16 at one end of its main shank 17. The head 16 is formed to be drivingly engaged by a tool (not shown), and while such formation may be of any type, it is shown, for convenience, as having a transverse kerf 18. At its other end, the main shank 17 has a tapered portion 19 for entry into a pilot hole in the work. The screw 15 has a helical thread 20 commencing at the extremity of the tapered work-entering or thread-forming portion 19 and extending at least part way along its main shank 17. Except at the protuberances on the work-entering end portion 19, the pitch diameter cross sections of the thread formation are of circular shape throughout the full length thereof. The thread formation on the shank portion, moreover, has crest, pitch and root diameters throughout the full length thereof.

In accordance with the invention, the screw 15 has in its thread-forming portion 19, a plurality of discrete thread-forming projections or protuberances 21 spaced circumferentially apart along the thread formation, which appear as bulges in the flanks and crest of the thread 20. The projections or protuberances 21 are shown as being shaped and dimensioned to extend beyond the outline of the thread 20 and as having their leading and trailing surfaces 21a and 21b curving gradually towards the adjacent thread flanks so that the projections 21 are rounded. However, it will be understood that the thread-forming projections may take a wide variety of shapes in addition to those shown as the only requirements are first that they so exceed the adjacent thread profile with respect to at least one flank and so support the screw as to effect a suitable reduction in friction between the thread of the screw and that formed in the hole in the work; second, that they do not rise so abruptly from the adjacent thread surfaces as to cause cutting of the parent material; and third, that the form of at least the projection farthest from the work-entering end or alternatively nearest or upon the main shank approximate the thread form in such main shank.

Figure 4:
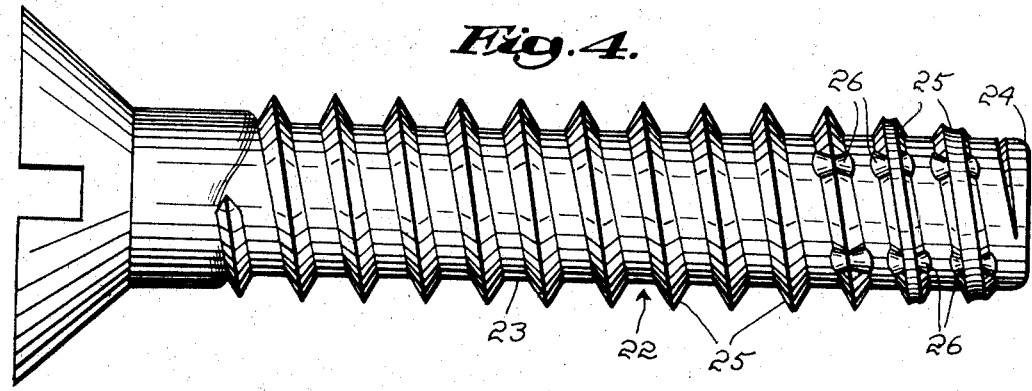
FIG. 4 is a view similar to FIG. 1 but showing a screw of the blunt point type with the major diameter of its thread tapered in its work-entering end.

The modification of self-tapping screw, generally indicated at 22 in FIG. 4 has its shank 23 terminating in a blunt, work-entering end 24. The screw has a constant pitch diameter throughout its length except at the projections where the otherwise constant pitch diameter is slightly varied by reason of such projections or protuberances. The major diameter of its thread 25 tapers or decreases in the thread-forming part thereof toward the work-entering end and in such part the thread crests are unfinished. The threads on the work-entering end portion are provided with thread-forming projections or protuberances 26 shaped and dimensioned to extend beyond the outline of the thread 25 on at least the flanks thereof. There are several projections 26 shown for each convolution of the thread 25 and these may be evenly indexed and of the same general shape as the projections 21 of the embodiment of the invention shown in FIGS. 1–3.

Figure 5:
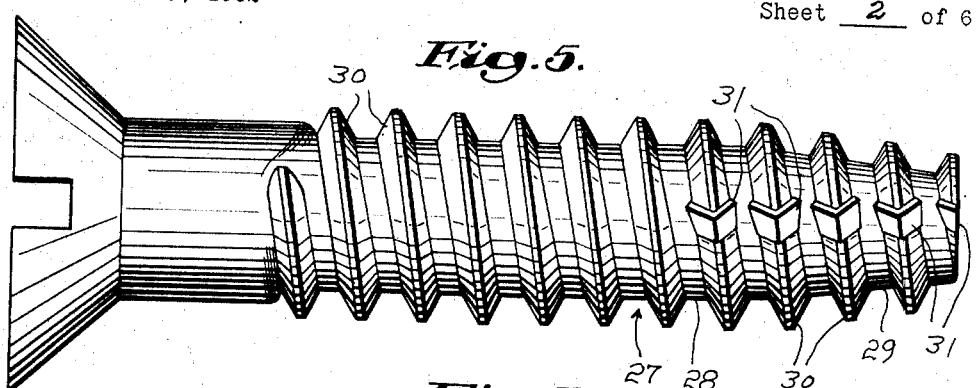
FIG. 5 is a view similar to FIGS. 1 and 4 but showing a screw of the blunt point type with both the major and minor diameters of its thread tapering in the work-entering end thereof.
Figure 6:
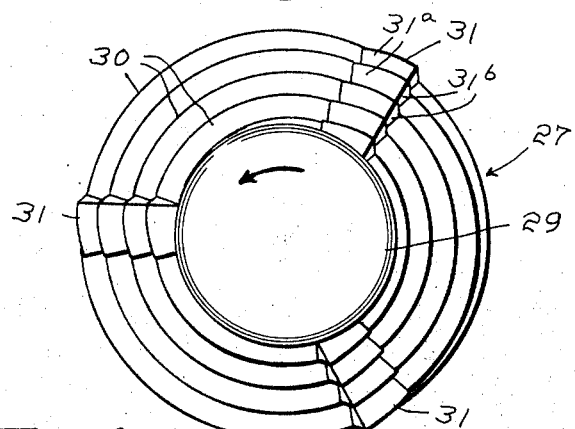
FIG. 6 is a view of the work-entering end thereof.

The self-tapping screw, generally indicated at 27 in FIGS. 5 and 6, is similar to the screw 22 except that its shank 28 has a tapered work-entering end 29 of progressively decreasing pitch diameter. In this instance the thread 30 on the tapered work-entering end is provided with a plurality of projections or protuberances 31, each shaped to extend beyond the outline of the adjacent thread 30. The projections 31 are shown as being evenly indexed and having gently inclined leading surfaces 31a for swaging the internal threads and trailing edges 31b and sharply inclined with reference thereto thus to establish locking shoulders designed to resist rotation in a direction opposite to the arrow.

Figure 7:
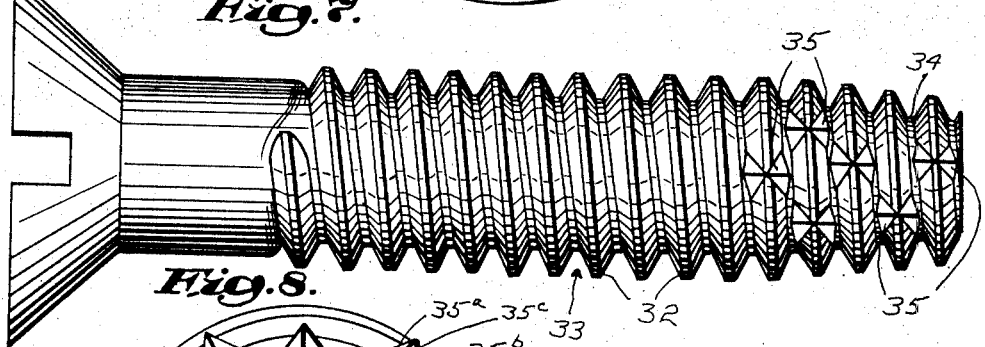
FIG. 7 is a side elevation, on an increased scale, of a self-tapping screw of the blunt point, machine screw type.
Figure 8:
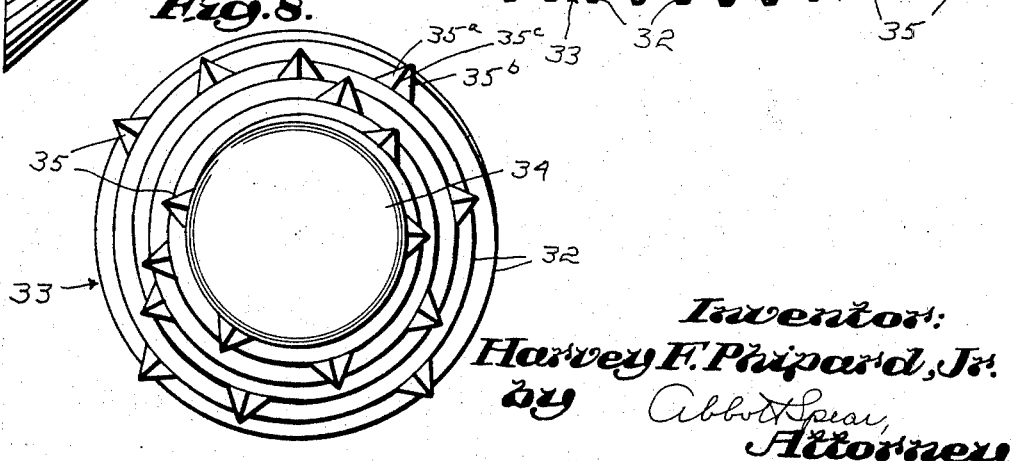
FIG. 8 is a view of the work-entering end thereof.

In the embodiment of the invention shown in FIGS. 7 and 8, the self-tapping screw 33 is provided with a machine screw thread 32 and the work-entering end 34 is blunt and tapered. The pitch diameter of the thread on the thread-forming part 34 decreases progressively toward the work-entering end. In the tapered thread-forming part 34, the thread 32 is provided with a plurality of thread-forming projections or protuberances 35 which are not evenly indexed but which extend beyond the flanks and crest of the adjacent thread 32. The projections 35 are shown as having their leading and trailing edges 35a and 35b respectively in the form of plane surfaces defining a transverse crest 35c.

For use in applications where the thread-forming end of a self-tapping screw may pass through the work, holding threads in that end may be eliminated. It is obvious that in the previously described modifications, the thread portions between the projections in the tapered work-entering end serve little, if any, purpose, since they are held out of contacting engagement with the threads being formed. For example, in FIGS. 9 and 10 is shown a self-tapping screw 42 having a tapered work-entering end 43.

In the thread-forming portion of the screw 42 there are thread-forming projections 44 which are arranged in the helical path extended of the thread 45 in the main shank. These projections 44 are substantially similar to the projections as previously described. It will be observed that they are elongate and are inclined at an angle with respect to the axis of the screw corresponding to the angle of the thread helix. Thus as the foremost projections bite into the wall of the pilot hole of the workpiece the screw will advance therein with the formation of an internal thread in the pilot hole to accommodate the thread 45. In this modification of the invention, the height of the projections may be varied considerably so long as they do not extend substantially beyond the thread flank and crest outlines in the main shank.

With respect to all modifications thus far described, it will be observed that there are several projections for each convolution of the thread. The projections 21 are preferably, though not necessarily evenly indexed. The number and arrangement of projections in the work-entering portion are largely a matter of choice, limited only by the fact that an undue number of projections will increase the driving torque unnecessarily. The distance between the outer tips of the projections and the screw axis increases from a minimum at the work-entering end to a maximum adjacent or upon the main shank not exceeding substantially one-half the maximum major diameter of the threads in the main shank. That is to say, the outer tips of the projections do not extend outwardly substantially beyond the crest outline of the thread in the main shank although the tips of the projections may extend slightly beyond such crest, such as 2 or 3 thousandths of an inch, to provide a small crest clearance in the main shank when desired, as shown in FIGS. 2 and 3 and as further explained below.

As mentioned above, each thread-forming projection or protuberance extends outwardly beyond the flanks and crest of the adjacent intermediate thread formation so as to hold such intermediate thread formation out of contact with the parent body as the tapered work-entering end portion of the screw is driven into the pilot hole. As illustrated in FIG. 3, the flanks of the projection in cross section are substantially parallel to the flanks of the adjacent thread so that the form, or cross-sectional shape, of the projection is substantially similar to that of the adjacent thread. The amount that each projection extends beyond the adjacent thread flanks and crest may vary depending upon the amount of cold working to be performed by such projection, the amount of clearance desired, and its proximity to the main shank. However, no projection has an overall thickness at any given distance from the screw axis substantially greater than the thickness of the thread in the main shank at the same distance from the screw axis. A projection may be slightly, say a few thousandths of an inch, thicker than the thread in the main shank where a slight clearance is desired in the main shank as well as in the work-entering portion, resulting in a minimum driving torque condition. This condition is shown in the screw of FIG. 1 where the projections extend onto the first thread convolution of the main shank so that the projections thereupon extend slightly beyond the flanks and crests of the threads in the main shank. Alternatively, clearance could be provided along only one of the flanks, or only along the crest to provide a slightly tighter fit by having the projections extend beyond only those thread surfaces in the main shank where clearance is desired.

The use of a self-tapping screw constructed in accordance with the invention as described above is illustrated in FIGS. 11 and 12. In FIG. 11, the self-tapping screw 36 is shown as being advanced into the pilot hole 37 in the work 38 with its projections 39 on the work-entering end having formed threads 40 therein. During the thread-forming operation, the thread 41 of the screw is supported without appreciable contact with the formed threads 40 in the work. The projections 39 have a maximum thickness at any given height exceeding slightly the corresponding thickness of the thread 41 in the main shank which provides clearance spaces as shown between the screw threads 41 and the internal threads 40 of the parent body 38 during thread formation.

When the screw is set up tightly, the projections 39 are brinelled into the formed threads 40 until the flanks of the screw thread 41 seat against the adjacent mating flanks of the formed threads 40 as will be apparent from FIG. 12. Oversized projections may cause such a large clearance between the flanks of the internal threads and screw threads in the main shank, as to require an excessive torque to brinell such projections sufficiently into the internal thread to effect engagement of adjacent mating threads. Therefore, in practice, the projections may exceed the associated threads by approximately $3/1000$ of an inch, by way of an example, with self-tapping screws below ¼ of an inch in diameter. On screws ¼ of an inch to ½ of an inch in diameter, the extension of the projections beyond the outline of the associated thread may range from $5/1000$ to, say, $10/1000$ of an inch. In any event, even if the brinelling is not a consideration as for example, when the work-entering, or thread-forming end extends through the work, the projections should not extend beyond the thread outline in the main shank to such an extent as will result in thread tolerances greater than recommended for the screw size and class of fit desired.

The screws are preferably formed by roll-threading a conventional round cylindrical screw blank. The projections may be formed in the thread-rolling process by having suitably shaped recesses in the face of the thread-rolling dies. Such recesses may be made by cutting the rolling die thread away at appropriate spots before hardening or by rolling a hardened mandrel of the desired shape between the pair of dies while still soft. During the rolling operation upon the screw blanks, the flow of metal will be controlled by such recesses to the extent that they will become filled with metal which is expressed from the flanks of the threads to form the projections or protuberances thereon as described herein.

According to a further aspect of the invention the formation of the projections during the rolling operation is facilitated by forming a depression in the surface of the metal immediately adjacent each projection. Such a depression tends to enhance the flow of metal into the notches in the die surface for forming the projections. These depressions are formed during the thread-rolling operation by providing the rolling die faces with appropriate protuberances for penetrating the surface of the screw blank.

Following roll-threading, the screws must, of course, be heat treated to obtain the desired hardness.

Figure 13:
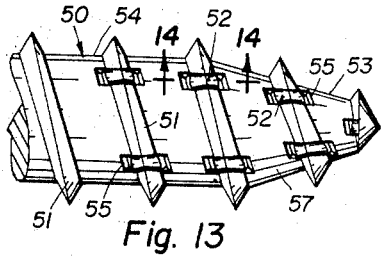
FIG. 13 is a side view of a portion of a self-tapping screw according to a further form of the present invention.
Figure 14:
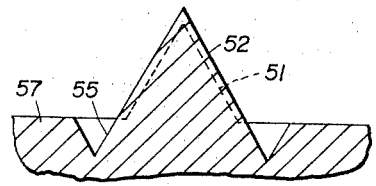
FIG. 14 is an enlarged partial sectional view through a thread projection taken in an axial plane along the line 14—14 of FIG. 13.

In FIG. 13 is shown a portion of a gimlet-point screw 50 similar to the screw of FIG. 1 having a rolled thread formation 51 provided with thread-forming projections 52 in the work-entering portion 53 and on the first thread convolution of the main shank 54. As shown clearly in FIG. 14, each projection 52 has adjacent wedge-shaped depressions 55 in the root surface 57 at the base of the thread flank from which material is displaced during the rolling operation and which displacement in turn facilitates the bulging of metal from the thread flanks to fill out the die notches provided for forming the projections 52.

Figure 15:
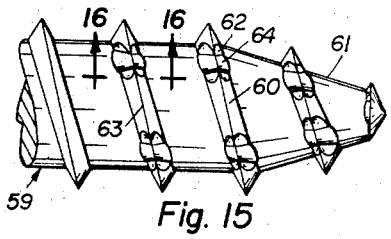
Figure 16:
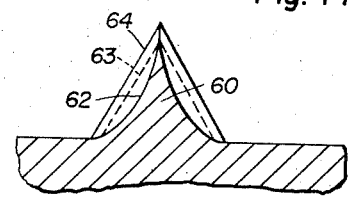

In FIG. 15 is shown a portion of a gimlet-point screw 59 similar to that of FIG. 13. However, as shown in FIG. 16 the thread formation 60, at least in the work-entering portion 61, has concave depressions 62 in the thread flanks 63 adjacent each projection 64, rather than in the root surface between threads.

Figure 17:
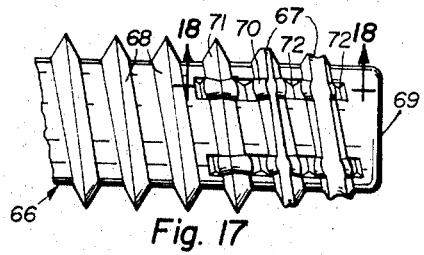
Figure 18:
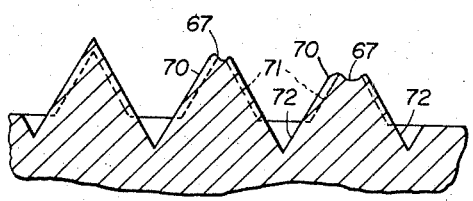

In FIGS. 17 and 18 is shown a portion of screw 66 similar to the screw of FIG. 4, having a constant pitch and root diameter throughout the threaded portion and a blunt work-entering end 69. The crest 67 of the thread formation 68 is tapered, or increasingly unfinished toward the work-entering end 69. As shown in FIG. 18 the projections 70 extend beyond and parallel to the adjacent thread flanks 71 and have associated depressions 72 provided in the root surface between adjacent thread convolutions. However, the close spacing of adjacent threads provided by this thread form allows room for only one such depression between each adjacent thread convolution.

Figure 19:
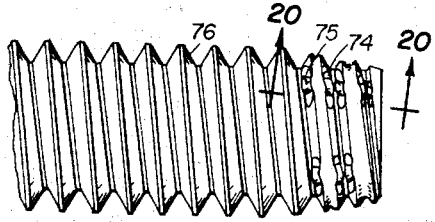
Figure 20:
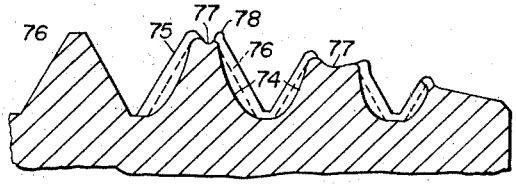

In FIG. 19, is shown a machine screw having concave depressions 74 adjacent each projection 75 in the flanks 76 of the thread. It will be noted that while the projections 75 on the threads do not for the most part extend beyond the thread crests, the thread-rolling operation causes slight lips 78 to form at the edges of the unfinished thread crest 77. These lips, of course, help in reducing the driving torque beyond what it would be should no crest clearance be provided.

Figure 21:
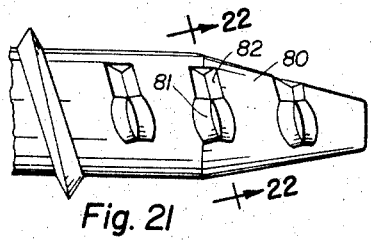
Figure 22:
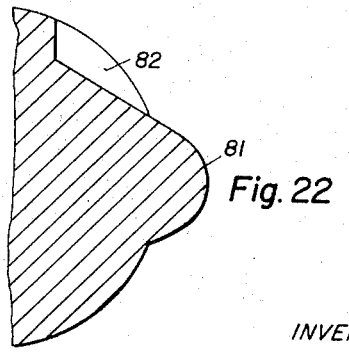
Figure 23:
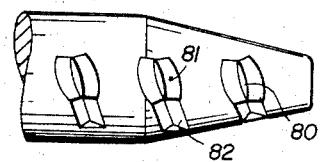

With reference now to FIG. 21, 22 and 23, screws are shown similar to the screw of FIG. 9, in which the work-entering portion 80 has no thread formation between projections 81. The formations of projections of these modifications are facilitated by providing depressions 82 in the screw surface at the base of either the trailing edge, FIG. 21, or leading edge, FIG. 23, of each projection.

In certain circumstances it may be desirable to provide the screw with a prevailing torque to minimize loosening of the screw, once it is driven home, without the use of a lock washer. A prevailing torque is provided by eliminating some or all thread clearance in the main shank portion by selection of the location and maximum thickness of the projections relative to such threads accordingly.

For purposes of illustrating this variation in FIGS. 24 to 26 a portion of a screw 86 is shown having a main shank 87 provided with a straight thread formation 88 of constant major, pitch, and minor diameters, terminating in a work-entering portion 89 provided with a tapered thread formation 90 having decreasing major and pitch diameters but a constant minor diameter. As shown more clearly in FIGS. 25 and 26, the thread formation 90 in the work-entering portion is provided with thread-forming projections 91 which extend beyond the flanks 92 and crest 93 of the intermediate thread to provide the necessary clearance during the thread forming.

However, a prevailing torque condition is achieved in this screw by dimensioning the maximum thickness T and height H of the projections 91a next adjacent the main shank so as not to exceed the corresponding thickness and height of the thread 88 in the main shank. In fact, by making the projections 91a nearest the main shank slightly smaller than the basic thread size a small interference fit will result when the threads in the main shank enter the threaded hole so that the first thread convolution 88 in the main shank will do a small amount of sizing as the screw is rotated into the work.

A prevailing torque may be undesirable in screws having a long length of thread engagement since the prevailing torque will progressively increase as the screw is driven further into the work and may reach an undesirably high level before the screw becomes seated. In such a case, the projections 94 may be extended onto the first thread convolution 95 in the main shank, as shown in FIG. 27.

In either the prevailing torque condition, FIG. 26, or in the minimum torque condition, FIG. 27, where clearance is provided in the main shank, the holding power of the screw will be substantially the same provided such clearance is kept within reasonable limits of a few thousandths of an inch as previously indicated. Further examples of screws provided with a minimum driving torque condition are the screws of FIGS. 1 to 18 and FIGS. 21 to 23.

In the previously discussed embodiments a depression in one thread flank or root surface is aligned with a similar and laterally opposite depression in the other flank or root surface of the same thread to provide similarly aligned raised portions extending beyond both thread flanks. It will be obvious, however, that such an arrangement is not essential, and the invention is not to be so limited. In fact each pair consisting of one depression and one raised portion on one flank may be spaced peripherally along the thread from a similar depression and raised portion on the opposite flank. Such a further variation of the invention is shown in FIGS. 28 and 29 in a screw 100 having a continuous thread formation 101 on a main shank 102 and work-entering portion 103. In this form, the entire thread 101 is displaced laterally at intervals, first to one side and then to the other side of its normal path or thread helix 104, giving the thread a wavy appearance at such intervals. In other words, the depression 109 in one thread flank is opposite a bulge or raised portion 110 in the opposite flanks. As shown in FIG. 29, the effect is the same as in other forms of the invention in that both flanks 105 and 106 in the displaced sections of the thread extend outwardly beyond and parallel to the respective thread flanks 107 and 108 of the adjacent normal thread 101.

Referring particularly to FIG. 30, which is an enlarged fragmentary cross sectional view taken along the pitch line of the thread through one of the projections, or protuberances, it will be observed that the section 3—3 of FIG. 3 is taken along a plane which intersects the protuberance 21 at the point of greatest width thereof, or in other words, at the point where the boundaries 120 of the protuberances are offset the greatest distance with respect to the adjacent flat flank of the thread 20. The line 122 represents the axis of the screw while the angle 124 represents the thread helix or lead angle which is measured with reference to a plane normal to the axis. The arrow 126 represents the direction of travel during driving operation. As previously explained with reference to FIG. 3, the boundaries 120 of the projections or protuberances extend substantially parallel with and substantially uniformly offset from the flat flank 127 of the thread 20 immediately forward thereof, including forward of any depression in such flank as in the case of FIGS. 16 and 20 from which metal was displaced in the formation of such protuberance. As viewed in FIG. 30, the surface of each projection or protuberance on at least the forward or leading side thereof, such as the surface portion 21a, slopes smoothly and gradually from the flank of the thread to the boundary 120 of the protuberance and at the mean angle 128 with respect to the screw axis 122 which is slightly greater than the angle 130 of the thread, that is, of the adjacent thread flank 127 with respect to the screw axis 122. A similar and corresponding relationship exists between the leading surface of the protuberance with respect to the adjacent thread flank on the opposite side of the thread, that is, angle 132 is greater than angle 134.

The mean angle of slope of the forward faces 21a with respect to the adjacent thread flanks may also be represented by the angle 136, and while this angle is not critical, it should be relatively small, that is, of the order of the lead angle 124.

In summarizing the method of the present invention and from the foregoing description, it will be observed that the self-tapping screw is made by first providing a headed blank having a main shank and work-entering end portions which are of circular cross section throughout. A continuous helical thread of uniform crest, pitch and root diameters is rolled on the shank portion of the blank, although it is to be understood that these diameters might have a slight up-taper so as to provide for a tight interference fit as the fastener is driven home, as previously described. A tapered thread is rolled on the work-entering end portion of the blank as a continuation of the helical thread on the shank portion. While rolling the thread portion on the work-entering end portion, the flow of metal defining the thread is so controlled as to cause metal to be expressed from the flanks of the thread, thereby simultaneously to form circumferentially spaced apart protuberant portions having outermost boundaries which are offset from the adjacent thread flanks. The flow of metal forming the protuberant portions is furthermore so controlled that the outermost boundaries 120 thereof, that is, in the plane of the maximum offset condition, as viewed, for example, in the view of FIG. 3, extend along lines substantially parallel with the flanks of the thread immediately forward of each such protuberance, as indicated by the dotted lines 20 in FIG. 3. The flow of metal forming each protuberance, and particularly on the leading side thereof, is furthermore so controlled as to define a surface sloping smoothly and gradually from the flank of the thread to the outermost boundaries thereof as indicated by the angle 136 in the view of FIG. 30 and which it will be noted is approximately of the order of the lead 124 of the thread 20.

The pitch diameter cross sections of the thread formations, that is, of course, neglecting the small protuberances, are of circular shape throughout the full length of the thread formation on both the shank and tapered work-entering end portion.

It is to be understood that while the various different modifications of the present invention have been described with particular reference to certain different illustrated screw and thread forms which are in common use such forms are intended not as limitations but as illustrations only, it being intended that any one modification of the present invention may in fact be used in any other type of screw or thread-forming member falling within the scope of the following claims.

It is to be further understood that while the present invention itself has been described with particular reference to certain illustrated embodiments, such embodiments are intended as illustrations only and not as limitations, it being intended to claim as part of the present invention all embodiments falling within the true spirit and scope of the following claims.

I claim:

1. A self-tapping fastener including:
(a) a shank portion having an enlarged upset head at one end and a tapered work-entering portion terminating in a tip at the other end,
(b) said shank and work-entering portions being provided with a continuous helical rolled thread formation throughout substantially the full length thereof,
(c) the pitch diameter cross sections of said rolled helical thread formation being of circular shape throughout the full length of said shank and said work-entering end portions,
(d) a plurality of circumferentially spaced apart discrete thread forming protuberances expressed from the flanks of the helical thread formation on said work-entering end portion and throughout substantially the full length thereof,
(e) each of said protuberances in cross section taken in the plane intersecting said protuberance at the point of greatest offset of said protuberance from the helix of the thread and in a direction at right angles to the thread having a cross sectional boundary line along at least one side thereof extending substantially parallel with said substantially uniformly offset from the flank of the thread immediately forward thereof in the direction toward the tip of said work-entering end portion,
(f) the surface of the protuberance on at least the forward side thereof in the direction toward said tip sloping smoothly and gradually from the flank of said thread to said boundary line,
(g) the crests of said protuberances from said tip to said shank increasing in distance progressively radially outwardly from the screw axis and the crest of the protuberance next adjacent the shank portion being substantially the same distance radially outwardly from said axis as the crest of the thread on said shank portion and also of substantially the same cross-sectional shape and dimensions.

2. A self-tapping fastener constructed in accordance with claim 1 and in which the thread formation is of greater cross-sectional area, in the axial direction, through said protuberances than through the thread formation immediately adjacent the opposite sides of each such protuberance.

3. A self-tapping fastener constructed in accordance with claim 2 in which each of said protuberances includes a portion offset from each of the opposed flanks of the thread formation.

4. The method of making a self-tapping screw having a shank portion with an enlarged upset head on one end thereof and a tapered work-entering end portion terminating in a tip on the other end, said method comprising the steps:
(a) providing a headed blank having a main shank and work-entering end portions of circular cross section throughout,
(b) rolling a continuous helical thread of uniform crest, pitch and root diameters on the shank portion of said blank,
(c) simultaneously rolling a continuation of said helical thread on said work-entering end portion tapering the same inwardly toward the tip thereof,
(d) and while rolling said last mentioned thread continuation, controlling the flow of metal defining the flanks of said thread so as to express offset protuberant portions extending outwardly in the axial direction from at least one side of said flanks at circumferentially spaced apart locations,
(e) and further controlling the flow of metal forming such protuberances so that the outermost cross sectional boundary thereof in the plane of maximum offset condition and in a direction at right angles to the thread extends along a line substantiall parallel with the flank of the thread immediately forward of each such protuberance in the direction toward the tip,
(f) and further controlling the flow of metal on the leading side of each protuberance so as to define a surface sloping smoothly and gradually from the flank of the thread to said boundary line,
(g) the thread on said work-entering end portion being so rolled that the crests of said protuberances from said tip to said shank increase progressively in distance radially outwardly from the screw axis and the crest of the protuberance next adjacent the shank portion is substantially the same distance radially outwardly from said axis as the crest of the thread on said shank portion and also of substantially the same cross-sectional shape and dimensions.

5. The method according to claim 4 in which the flow of metal is controlled at least in part during the formation of said protuberances by displacing metal from an area of the screw immediately adjacent each of said protuberances for gathering metal for formation of each such protuberance.

6. A self-tapping fastener including:
(a) a shank portion having a tapered work-entering portion terminating in a tip,
(b) said shank and work-entering portions being provided with a continuous helical rolled thread formation,
(c) a plurality of circumferentially spaced apart discrete thread forming protuberances on the flanks of the helical thread formation on said work-entering end portion and throughout substantially the full length thereof,
(d) the pitch diameter cross sections of said rolled helical thread formation other than at said protuberances being of circular shape throughout the full length of said threaded shank and said work-entering end portions,
(e) each of said protuberances in cross section taken in the plane intersecting said protuberance at the point of greatest offset of said protuberance from the helix of the thread and in a direction at right angles to the thread having a cross-sectional boundary line along at least one side thereof extending substantially parallel with and substantially uniformly offset from the flank of the thread immediately forward thereof in the direction toward the tip of said work-entering end portion,
(f) the surface of the protuberance on at least the forward side thereof in the direction toward said tip sloping smoothly and gradually from the flank of said thread to said boundary line,
(g) the crest of said protuberances from said tip to said shank increasing in distance progressively radially outwardly from the screw axis and the crest of the protuberance next adjacent the shank portion being substantially the same distance radially outwardly from said axis as the crest of the thread on said shank portion and also of substantially the same cross-sectional shape and dimensions.

7. The method of making a self-tapping screw having a shank portion and a tapered work-entering end portion terminating in a tip, said method comprising the steps:
(a) providing a blank having a main shank and work-entering end portions of circular cross section throughout,
(b) rolling a continuous helical thread of uniform crest, pitch and root diameters on the shank portion of said blank,
(c) simultaneously rolling a continuation of said helical thread on said work-entering end portion tapering the same inwardly toward the tip thereof,
(d) and while rolling said last mentioned thread continuation, controlling the flow of metal defining the flanks of said thread so as to form offset protuberant portions extending outwardly in the axial direction from at least one side of said flanks at circumferentially spaced apart locations,
(e) and further controlling the flow of metal forming such protuberances so that the outermost cross-sectional boundary thereof in the plane of maximum offset condition and in a direction at right angles to the thread extends along a line substantially parallel with the flank of the thread immediately forward of each such protuberance in the direction toward the tip,
(f) and further controlling the flow of metal on the leading side of each protuberance so as to define a surface sloping smoothly and gradually from the flank of the thread to said boundary line,
(g) the thread on said work-entering end portion being so rolled that the crests of said protuberances from said tip to said shank increase progressively in distance radially outwardly from the screw axis and the crest of the protuberance next adjacent the shank portion is substantially the same distance radially outwardly from said axis as the crest of the thread on said shank portion and also of substantially the same cross-sectional shape and dimensions.

8. A self-tapping fastener constructed in accordance with claim 6 in which the surface of the protuberance on the side thereof away from said tip slopes abruptly from said boundary line toward said flank.

References Cited

UNITED STATES PATENTS

| | | | |
|---|---|---|---|
| 2,807,813 | 10/1957 | Welles | 10—152 |
| 2,703,419 | 3/1955 | Barth | 10—152 |
| 2,352,982 | 7/1944 | Tomalis | 10—152 |
| 1,676,482 | 7/1928 | De Lapotterie | 10—152 |
| 2,165,011 | 7/1939 | Rosenberg | 85—47 |
| 2,284,659 | 6/1942 | Hosking | 151—22 |
| 2,355,486 | 8/1944 | Tinnerman | 85—46 |
| 2,991,491 | 7/1961 | Welles | 10—152 |
| 1,933,332 | 10/1933 | May | 85—47 |
| 2,347,360 | 4/1944 | Nuenchinger | 85—48 |

EDWARD C. ALLEN, *Primary Examiner.*

U.S. Cl. X.R.

85—48; 151—22; 10—10

UNITED STATES PATENT OFFICE
CERTIFICATE OF CORRECTION

Patent No. 3,426,642                          February 11, 1969

Harvey F. Phipard, Jr.

It is certified that error appears in the above identified patent and that said Letters Patent are hereby corrected as shown below:

Column 1, line 50, "valves" should read -- values --. Column 2, line 28, "and" should read -- end --. Column 9, line 40, after "lead" insert -- angle --. Column 10, line 10, "said" should read -- and --. Column 12, line 48, "Nuenchinger" should read -- Muenchinger --.

Signed and sealed this 24th day of March 1970.

(SEAL)
Attest:

Edward M. Fletcher, Jr.                      WILLIAM E. SCHUYLER, JR.
Attesting Officer                              Commissioner of Patents